No. 727,044. PATENTED MAY 5, 1903.
A. WHITE.
DETACHABLE SPRING SLED RUNNER.
APPLICATION FILED OCT. 18, 1901.
NO MODEL.

Witnesses.
C. N. Keeney.
Anna V. Faust.

Inventor.
Arthur White
By Benedict & Morsell
Attorneys.

No. 727,044. Patented May 5, 1903.

UNITED STATES PATENT OFFICE.

ARTHUR WHITE, OF SHEBOYGAN FALLS, WISCONSIN.

DETACHABLE SPRING SLED-RUNNER.

SPECIFICATION forming part of Letters Patent No. 727,044, dated May 5, 1903.

Application filed October 18, 1901. Serial No. 79,056. (No model.)

*To all whom it may concern:*

Be it known that I, ARTHUR WHITE, residing at Sheboygan Falls, in the county of Sheboygan and State of Wisconsin, have invented a new and useful Improvement in Detachable Spring Sled-Runners, of which the following is a description, reference being had to the accompanying drawings, which are a part of this specification.
My invention has relation to improvements in detachable spring sled-runners. It is more especially intended, although not necessarily, as a detachable spring sled-runner for boys' wagons, particularly of the type of boys' wagons covered in United States Letters Patent issued to me on December 11, 1900, No. 663,526 and No. 663,527.

The primary object of the invention is to provide a simple form of spring sled-runner which can be cheaply constructed and is adapted to be readily connected to and disconnected from the axles of vehicles.

With the above primary object in view the invention consists of the devices and parts or their equivalents, as hereinafter set forth.

In the accompanying drawings, illustrating my invention, I show the runners applied to the form of boy's wagon covered in my United States Letters Patent No. 663,526, dated December 11, 1900, and above referred to.

Figure 1:
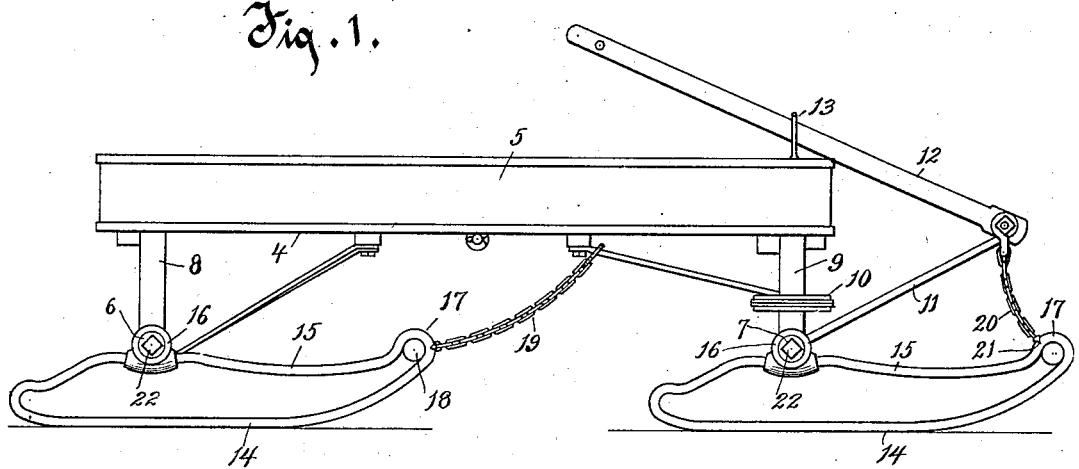
Figure 2:
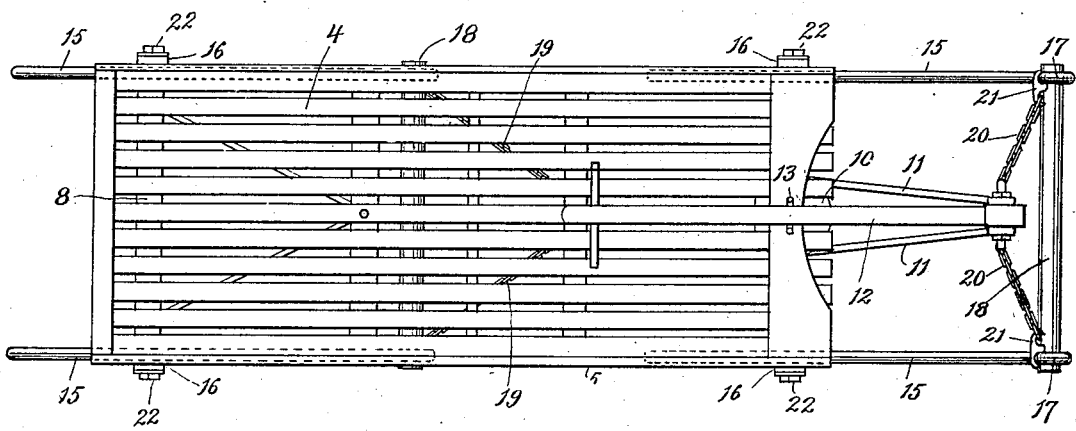

In the drawings, Figure 1 is a side elevation of a wagon with the wheels removed and the runners applied thereto. Fig. 2 is a plan view of Fig. 1; and Fig. 3 is a detail plan view of one of the runners, showing a fragment of the transverse connecting-rod extending therefrom.

The form of the wagon in connection with which I illustrate my invention consists generally of a slatted bottom 4 and a box 5, fitted thereto and which is preferably removably fitted thereto, so as to adapt the wagon to be used as a buckboard when the box is disconnected, the rear and front axles 6 and 7, respectively, and the rear and front bolsters 8 and 9, respectively, connecting said axles with the under side of the bottom 4. The front axle 7 and the bolster 9 are each provided with encircling pieces complementary to each other and forming the fifth-wheel or bearing 10 between the axle and the bolster, by means of which the bolster and its load are supported on the axle and permit the axle to swivel thereunder. A king-bolt (not shown) connects the axle to the bolster and is the pivot upon which the swiveling of the axle occurs on the bearing 10. A pair of hounds 11 11 are fixed in the axle 7 and project forwardly and upwardly therefrom, and between the forwardly-converging ends thereof is pivoted the tongue 12. By means of this tongue the vehicle can be hauled about; but when it is desired to use the vehicle as a coaster the tongue is thrown rearwardly and made to engage the bifurcated upper end of a thole-pin 13, which serves as a fulcrum for the tongue and adapts said tongue to act as a lever or tiller, which can be grasped by a boy seated on the wagon and swung to the right or left to thereby shift the position of the wheels or the runners when substituted for the wheels and change the direction of running of the vehicle.

My improved runner consists of a metallic spring-rod made continuous by connecting the ends thereof together and bent so as to form the lower longitudinal spring member 14, constituting the runner, and the upper longitudinal connecting spring-rail member 15. At an intermediate point in the upper member of each runner the ends of the rod are connected together by a device, which being bored transversely forms a hub 16. The ends of the rod are fitted in tubular extensions which project from opposite sides of and at right angles to the hub 16. The forward end of the under member or runner is bent upwardly to meet the upper member, and thereby form the nose portion 17 of the runner, said nose portion being preferably of a rounded or circular formation. There are of course two of these runners at the rear of the vehicle and two at the forward end thereof. Each pair of runners is advisably connected by means of a transverse connecting-rod 18, the opposite ends of said rod fitting and secured in the circular nose portions of the runners. Slack chains 19 19 may also be connected to the nose of the rear runners, and these chains are extended forwardly and upwardly and converged, the converged ends being connected to the bottom of the vehicle or to suitable brace-rods secured to said bottom. Similar chains 20 20 are connected to the noses of the front runners and are then extended upwardly and rearwardly and converged, the converged ends being secured to the hounds 11.

Figure 3:
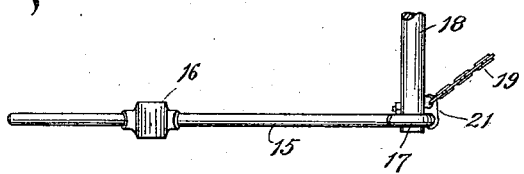

The preferred means for securing the ends of the transverse connecting-rods 18 consist in providing each of said rods, near opposite ends, with T-bolts 21, the ends of the head of each bolt being bent rearwardly, one of said rearwardly-bent ends being bent around or clipped to the nose of the runner, while the other bent end may be used for connecting the lower end link of the chain, as most clearly shown in Fig. 3.

When my improved form of runners are to be applied to a wagon, the wheels of said wagon are of course first removed from the axles and the hubs of the upper members of the runners adjusted onto the ends of the axles, as shown in the drawings, bolts 22 being screwed into the ends of the axle, with the heads thereof against the hubs 16, so as to securely hold the runners on the ends of the axle. A vehicle thus equipped forms a very efficient sled, which may be hauled along by a boy or used as a coaster.

The improved runners are of very simple construction, and by reason of the space between the upper and lower members thereof and the material of which said runners are made the maximum amount of spring is afforded thereto.

When desired, the vehicle is quickly reconverted into wagon form merely by taking out the bolts 22 and readjusting the wheels to place.

While I have illustrated my improved form of runners in connection with a wagon of the form of construction covered in my United States Letters Patent No. 663,526, dated December 11, 1900, yet, as stated at the outset of the specification, it is equally applicable to the form of wagon covered in my United States Letters Patent No. 663,527, issued on the same date. It is of course also adapted for large vehicles and may be readily applied to the ends of the axle thereof if made of the proper size and dimension.

What I claim as my invention is—

1. A sled-runner formed from a single elastic rod, bent so as to provide a lower longitudinal base member or runner and an upper rail member, with a clear or unobstructed space therebetween, the extremities of the rod being brought together in the upper member, and the elasticity of the rod and the clear space between the two members thereof forming the latter into spring or yielding members, and a single coupling member provided with tubular extensions projecting in the direction of and receiving the respective ends of the rod, and also provided with a transverse tubular portion forming a hub.

2. The combination of sled-runners, each formed from a single elastic rod, bent so as to provide a lower longitudinal base member or runner, and thence bent upwardly at opposite ends, and then continued horizontally, or substantially so, until the ends thereof are brought closely together, in order to form an upper rail member, the forward portion or nose of each runner at the bend being bent into rounded or partly-circular form, means for uniting the adjacent ends of the rod forming each runner, and a transverse connecting-rod having its opposite ends fitted in the rounded nose portions of the runners.

In testimony whereof I affix my signature in presence of two witnesses.

ARTHUR WHITE.

Witnesses:
C. T. BENEDICT,
ANNA V. FAUST.